(12) United States Patent
Moore et al.

(10) Patent No.: US 11,606,141 B2
(45) Date of Patent: Mar. 14, 2023

(54) ROUTING OF OPTICAL SIGNALS

(71) Applicant: FUJITSU LIMITED, Kawasaki (JP)

(72) Inventors: Francois Georges Moore, Plano, TX (US); William Schubert, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/316,319

(22) Filed: May 10, 2021

(65) Prior Publication Data
US 2022/0360333 A1 Nov. 10, 2022

(51) Int. Cl.
*H04Q 11/00* (2006.01)
*H04B 10/079* (2013.01)
*H04B 10/2575* (2013.01)
*H04L 45/12* (2022.01)
*H04L 45/00* (2022.01)
*H04L 45/121* (2022.01)
*H04L 43/0823* (2022.01)
*H04L 43/0882* (2022.01)
*H04L 43/0852* (2022.01)

(52) U.S. Cl.
CPC ... *H04B 10/25754* (2013.01); *H04B 10/0793* (2013.01); *H04B 10/0795* (2013.01); *H04L 43/0847* (2013.01); *H04L 43/0852* (2013.01); *H04L 43/0882* (2013.01); *H04L 45/121* (2013.01); *H04L 45/123* (2013.01); *H04L 45/124* (2013.01); *H04L 45/26* (2013.01); *H04Q 2011/0073* (2013.01); *H04Q 2011/0086* (2013.01)

(58) Field of Classification Search
CPC .......... H04B 10/0793; H04Q 11/0064; H04Q 11/0073; H04Q 11/0079; H04Q 11/0086
See application file for complete search history.

(56) References Cited

U.S. PATENT DOCUMENTS

| 10,511,388 | B1* | 12/2019 | Vassilieva | H04B 10/516 |
| 2006/0251419 | A1* | 11/2006 | Zadikian | H04Q 11/0062 398/51 |
| 2009/0162075 | A1* | 6/2009 | Naito | H04Q 11/0062 398/182 |
| 2011/0135305 | A1* | 6/2011 | Barnard | H04J 14/0293 398/49 |
| 2014/0341572 | A1* | 11/2014 | Sambo | H04J 14/0267 398/48 |
| 2019/0288775 | A1* | 9/2019 | Maeda | H04B 10/27 |

* cited by examiner

*Primary Examiner* — Nathan M Cors
(74) *Attorney, Agent, or Firm* — Maschoff Brennan

(57) ABSTRACT

A method may include obtaining a topology of an optical network. The topology may indicate multiple optical links within the optical network. The method may also include obtaining a routing metric for each of the optical links. The routing metric may be used in selecting routes through the optical network along the multiple optical links. The method may further include obtaining a signal noise tolerance of an optical signal to be routed through the optical network and adjusting routing metrics of one or more of the multiple optical links based on the signal noise tolerance of the optical signal. The method may also include after the routing metrics of the one or more of the multiple optical links are adjusted, determining a route for the optical signal through the optical network along two or more of the multiple optical links based on the routing metrics of the multiple optical links.

20 Claims, 11 Drawing Sheets

ROUTING OF OPTICAL SIGNALS

FIELD

The embodiments discussed in the present disclosure are related to routing of optical signals.

BACKGROUND

An optical network may include multiple different optical paths between sources and destinations within the optical network. For example, an optical network may include multiple optical paths that include transponders with optical fibers over which an optical signal may be transmitted. An algorithm may select an optical path for an optical signal through the optical network based on information about the optical paths.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include obtaining a topology of an optical network. The topology may indicate multiple optical links within the optical network. The method may also include obtaining a routing metric for each of the optical links. The routing metric may be used in selecting routes through the optical network along the multiple optical links. The method may further include obtaining a signal noise tolerance of an optical signal to be routed through the optical network and adjusting routing metrics of one or more of the multiple optical links based on the signal noise tolerance of the optical signal. The method may also include after the routing metrics of the one or more of the multiple optical links are adjusted, determining a route for the optical signal through the optical network along two or more of the multiple optical links based on the routing metrics of the multiple optical links.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
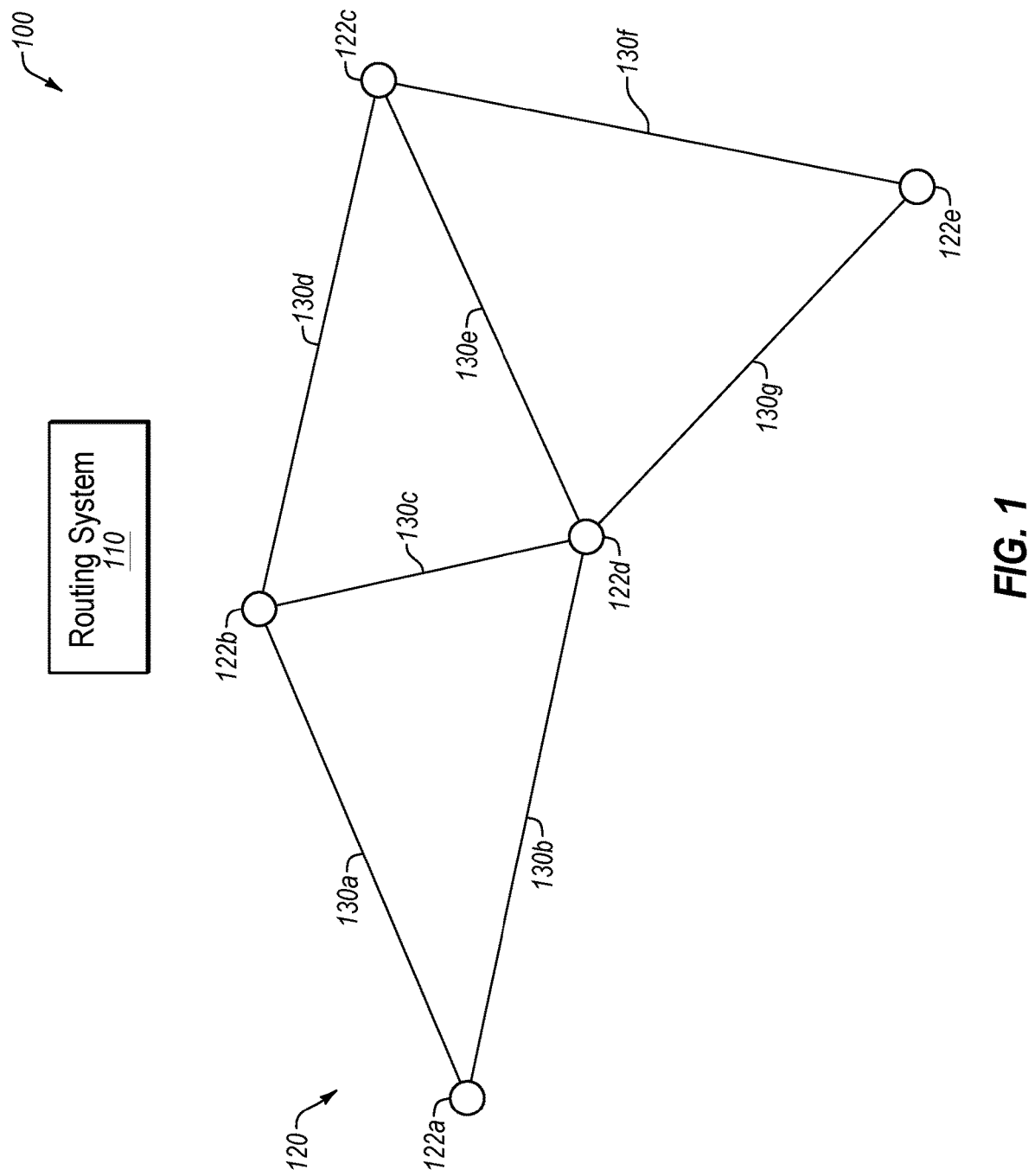
FIG. 1 illustrates an example environment for determining routes for optical signals through an optical network.

An optical network may include a complex topology based on the distribution of transponders, reconfigurable optical add-drop multiplexers (ROADMs), and intermediate line amplifiers (ILAs) within the optical network and the optical fibers between them. As a result, there may be multiple different routes through the optical network for an optical signal sent between a given source and destination.

In some circumstances, a route through an optical network along optical links of the optical network may be determined based on available capacity and fiber characteristic information of optical fibers of the optical links within the optical network. The available capacity and the fiber characteristic information may be used to determine a routing metric to select routes along the optical links. For example, an optical link with better characteristics, based on the fiber characteristic information of the optical fibers in the optical link, as compared to other optical links may include routing metrics that may favor selection of the optical link over the other optical links in the network even if the requested optical signal does not request using the optical link with the better characteristics. As a result, the optical link with the better characteristics may be selected before other optical links for routing an optical signal even when the other optical links may include characteristics able to support the requested optical signal. Thus, the capacity of the optical link with the better characteristics may be consumed before the capacity of other optical links within the optical network. As a result, after some time the optical network may only include capacity on optical links with characteristics less ideal than the optical links currently being used. Thus, even though an optical network may include capacity, the capacity may not be usable for optical signals with a signal noise tolerance that is too stringent for the remaining capacity available within the optical network.

Some embodiments in this disclosure may relate to ranking of optical links within an optical network based on a number of the optical signal types that each of the optical links is able to support. In some embodiments, the ranking of the optical links may be based on a signal noise tolerance of the different optical signal types supported by the optical network and/or the optical noise for each of the optical links within the optical network. The ranking of the optical links may be used in determining a route for an optical signal through the optical network.

In some embodiments, using the ranking of the optical links when determining a route for an optical signal may allow optical links to be selected for a route that would not have previously been selected. As a result, the optical links with the better characteristics may be preserved for future optical signals. Thus, ranking of the optical links may increase usage of an optical network, increase a life span of an optical network, and improve optical network efficiency.

Alternately or additionally, some embodiments in this disclosure may be configured to adjust routing metrics of optical links within an optical network based on a signal noise tolerance of an optical signal to be routed through the optical network. In these and other embodiments, a route for the optical signal may be determined based on an adjusted routing metric. As such, an optical signal with a higher noise tolerance may be routed through optical links with characteristics less ideal than other optical links in the optical network. Thus, the optical links with the better characteristics may be preserved for other future optical signals. Thus, routing of optical signals based on adjusted routing metrics may increase usage of an optical network, increase a life span of an optical link, and improve optical network efficiency. Therefore, some embodiments described in this disclosure provide a novel technical solution to the technical problem of routing in optical networks. As such, some embodiments described in this disclosure provide a practical application with respect to routing in optical network that provides a meaningful advancement in the technology of optical networks.

FIG. 1 illustrates an example environment 100 for determining routes for optical signals through an optical network, according to at least one embodiment in the present disclosure. The environment 100 may include a routing system 110 and an optical network 120. The optical network 120 may include a first network node 122a, a second network node 122b, a third network node 122c, a fourth network node 122d, and a fifth network node 122e, referred to collectively as the network nodes 122. The optical network 120 may further include a first optical link 130a, a second optical link 130b, a third optical link 130c, a fourth optical link 130d, a fifth optical link 130e, a sixth optical link 130f, and a seventh optical link 130g, referred to collectively as the optical links 130. Each of the optical links 130 may extend between two of the network nodes 122 as illustrated in FIG. 1.

Figure 2:
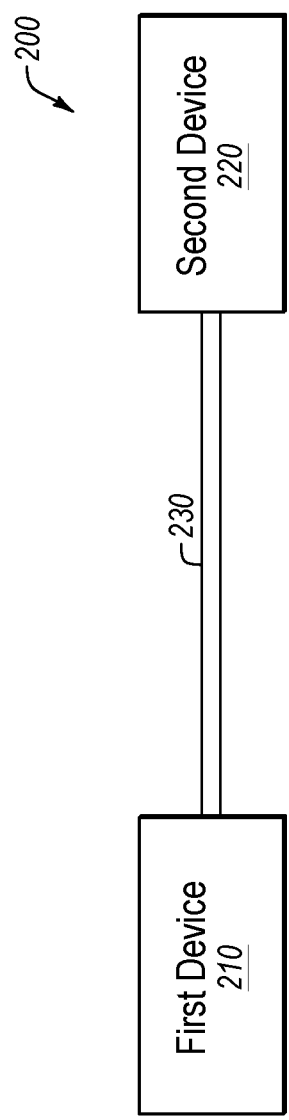
FIG. 2 illustrates an example optical link.

In some embodiments, each of the optical links 130 may include an optical fiber that connects a transmitter in one network node and a receiver in another network node of the optical network 120. For example, the first optical link 130a may include a transmitter in the first network node 122a, a receiver in the second network node 122b, and an optical fiber between the first network node 122a and the second network node 122b that is coupled between the transmitter and the receiver. Alternately or additionally, the first optical link 130a may also include a receiver in the first network node 122a, a transmitter in the second network node 122b, and an optical fiber between the first network node 122a and the second network node 122b that is coupled between the transmitter and the receiver. An example optical link is illustrated in FIG. 2. The receivers and the transmitters of the optical links 130 in the network nodes 122 may be parts of transponders or other optical equipment used to receive, transmit, adjust, or otherwise handle optical signals in the network nodes 122.

In some embodiments, the routing system 110 may be configured to determine a route through the optical network 120 from a source network node to a destination network node for an optical signal. To determine a route though the optical network 120, the routing system 110 may obtain a topology of the optical network 120. The topology of the optical network 120 may provide information about the optical network 120. The information may include a number and location of the network nodes 122 and the optical links 130 that connect the network nodes 122.

In some embodiments, the routing system 110 may be further configured to obtain additional information about the optical links 130 within the optical network 120. For example, the routing system 110 may obtain routing metrics for each of the optical links 130 within the optical network 120. The routing metrics may be one or more values that may be used by a routing algorithm to determine a route for an optical signal through the optical network 120.

In some embodiments, a routing algorithm used to determine a route for an optical signal may be configured to optimize the route. For example, every route through an optical network 120 may be assigned a score based on the routing metrics of the optical links 130 used for the route within the optical network 120. As an example, for a route from the first network node 122a to the third network node 122c, the score of the route may be based on the routing metrics of the first optical link 130a and the fourth optical link 130d. In some embodiments, a routing algorithm used to determine a route for an optical signal may be configured to optimize the route by minimizing or reducing the score of a route.

In some embodiments, the routing metrics of the optical links 130 may be associated with or based on one or more criteria that form a basis for routing of the optical signal through the optical network. For example, the criteria may include costs of operating an optical link, a length of the optical link, an optical signal to noise ratio of an optical link, a latency of an optical link, and/or available capacity of an optical link, among other criteria. In these and other embodiments, the routing metric of an optical link may have a value or values that is determined based on these criteria. For example, a value of a routing metric of an optical link may be a mathematical combination of values for each of the criteria. The values may represent scores of the optical link with respect to the criteria or some other evaluation of the optical link with respect to the criteria. Alternately or additionally, the value of the routing metric of the optical link may be a vector or an array of values that represent values for each of the criteria.

In some embodiments, when the routing system 110 is determining a route through the optical network 120 for an optical signal, the routing system 110 may obtain a signal noise tolerance of the optical signal. A signal noise tolerance of the optical signal may indicate how tolerant an optical signal is to optical noise, where the tolerance indicates an ability of the optical signal to maintain the integrity of the optical signal in the presence of a particular amount of noise. For example, a first optical signal with a higher signal noise tolerance may maintain the integrity of the optical signal in a system with first optical noise whereas a second optical signal with a lower signal noise tolerance may not be able to be decoded in the system with the first optical noise.

In some embodiments, the routing system 110 may be configured to adjust the routing metrics of one or more of the optical links 130 based on the signal noise tolerance of the optical signal to be routed. For example, the routing system 110 may be configured to adjust the routing metrics of the one or more of the optical links 130 to decrease the likelihood of the selection of the one or more of the optical links 130 being selected by the routing algorithm to form the route for the optical signal. How the routing metrics may be adjusted based on the signal noise tolerance of the optical signal may be based on the routing algorithm used to determine the route. For example, in response to the routing algorithm being confirmed to reduce or minimize a score of a route, the routing metrics of one or more of the optical links 130 may be adjusted by increasing the routing metrics of the one or more of the optical links 130. As another example, in response to the routing algorithm being confirmed to increase or maximize a score of a route, the routing metrics of one or more of the optical links 130 may be adjusted by decreasing the routing metrics of the one or more of the optical links 130.

In some embodiments, an amount of the adjustment to the routing metrics may vary based on the signal noise tolerance of the optical signal to be routed. For example, as the signal noise tolerance increases the adjustment may increase. An increase in the adjustment may further decrease the likelihood of the selection of the one or more of the optical links 130. To further explain, an increase in a signal noise tolerance may indicate that an optical signal is able to handle more noise and thus be carried by a larger number of optical links 130 with lower quality characteristics. To avoid using the optical links of the optical network 120 to carry any or a selected subset of signals, the adjustment is increased to further decrease the likelihood of the selection of these optical links of the optical network 120 to carry any or a selected subset of signals.

As a concrete example, assume that three of the optical links 130 are configured as higher quality optical links such that any optical signal supported by the optical network 120 may traverse the higher quality optical links based on the optical noises of the higher quality optical links. However, two of the optical links 130 may be configured as lower quality optical links such that only a subset of the optical signals supported by the optical network 120 may traverse the lower quality optical links. If a first optical signal with a higher signal noise tolerance is routed over the higher quality optical links, even though the lower quality optical links may carry the first optical signal, the capacity of the higher quality optical links may be reduced. As a result, when a second optical signal, which includes a lower signal noise tolerance such that the lower quality optical links cannot carry the second optical signal, the optical network 120 may not have capacity to carry the second optical signal. However, had the first optical signal being routed over the lower quality optical links, the higher quality optical links would have retained capacity to allow the second optical signal to be routed over the higher quality optical links. To reduce the likelihood that the higher quality optical links are selected for the route for the first optical signal, the routing system 110 may adjust the routing metrics of the higher quality optical links such that the lower quality optical links appear more favorable for selection in a route for the first optical signal.

In short, the routing system 110 may be configured to adjust the routing metrics of one or more of the optical links 130 based on the signal noise tolerance of the optical signal to adjust selection of the optical links 130 during route selection. As a result, the routing system 110 may allow lower quality optical links to be selected for a route that would not otherwise be considered in priority and thereby maintaining more capacity on higher quality optical links.

Note that in some circumstances, a higher quality optical link may be selected for a route regardless of the adjustments to the routing metrics. For example, for a route to the fifth network node 122e, the route may use one of the seventh optical link 130g and the sixth optical link 130f. If both the seventh optical link 130g and the sixth optical link 130f are higher quality optical links one may be selected for a route to the fifth network node 122e because the fifth network node 122e may not be reached without traversing one of the seventh optical link 130g and the sixth optical link 130f. Thus, in some embodiments, the adjustment of the routing metrics may not remove optical links from consideration because removal of optical links may result in an inability to route an optical signal to a particular network node.

In some embodiments, the optical network 120 may be configured to support multiple different optical signal types. In these and other embodiments, the optical signal types may be determined based on characteristics of the optical signals, such as a modulation scheme, a data rate, and/or a channel spectral width, among others. In some embodiments, optical signals with all the same characteristics may be considered optical signals of the same type. Alternately or additionally, optical signals with some shared characteristics and some different characteristics may be considered optical signals of the same type. The routing system 110 may determine the signal noise tolerances of each of the optical signal types based on the characteristics of the optical signal types.

In some embodiments, the routing system 110 may also be configured to obtain an optical noise contribution for one or more of the optical links 130 in the optical network 120. For example, the routing system 110 may be configured to obtain the optical noise contribution for each of the optical links 130 in the optical network 120.

In some embodiments, the optical noise contribution for the optical links 130 may be based on a non-linear noise contribution of optical fiber in the optical links 130. Alternately or additionally, the optical noise contribution for the optical links 130 may be based on an amplified stimulated emission noise of network elements in the optical links 130.

In some embodiments, the optical noise contribution of an optical link may be based on an optical signal being carried by the optical link. For example, the optical noise for the optical links 130 may be based on a non-linear noise contribution of optical fiber in the optical links 130 where the non-linear noise contribution of the optical fiber in the optical links 130 is based on an optical signal type being carried by the optical fiber.

In these and other embodiments, the routing system 110 may be configured to obtain the optical noise for each of the optical links 130 with respect to each of the optical signal types supported by the optical network 120. For example, if there five optical signal types supported by the optical network 120, the routing system 110 may obtain the optical noise for each of the optical links 130 with respect to each of the five optical signal types.

In some embodiments, the optical signal types supported by the optical network 120 may include all optical signal types that may be supported by the optical network 120. Alternately or additionally, the optical signal types supported by the optical network 120 may include optical signal types that may be used in the optical network 120 given the parameters of the type of data that may be carried by the optical network 120.

In some embodiments, the routing system 110 may rank the optical links 130 based on a quality of the optical links 130. The quality of the optical links 130 may be defined based on the types of optical signals with varying signal noise tolerances that the optical links 130 may be configured to support. The optical signal types that the optical links 130 may be configured to support may be determined by the routing system 110 based on signal noise tolerances of the optical signal types and optical noise of the optical links 130. In these and other embodiments, the optical links 130 may determine a number of the optical signal types that each of the optical links 130 may be configured to support. Based on the number of the optical signal types that each of the optical links 130 may be configured to support, the routing system 110 may rank the optical links 130.

In some embodiments, the routing system 110 may categorize the optical links 130 based on the ranking of the optical links 130. For example, the optical links 130 with higher rankings may be categorized as high quality optical links, the optical links 130 with middle rankings may be categorized as middle quality optical links, and the optical links 130 with lower rankings may be categorized as lower quality optical links.

In some embodiments, categorization of the optical links 130 may not be based only on the ranking of the optical links 130 determined by the number of the optical signal types that each of the optical links 130 may be configured to support. In these and other embodiments, the optical links 130 may be categorized based on the optical signal types that each of the optical links 130 is able to support and a ranking of the optical signal types. In these and other embodiments, the routing system 110 may be configured to rank the optical signal types based on the signal noise tolerances of each of the optical signal types. Alternately or additionally, the routing system 110 may be configured to determine which of the optical signal types that each of the optical links 130 is able to support based on the optical noise for each of the optical links 130 and the signal noise tolerance for each of the optical signal types. In these and other embodiments, the optical links 130 may be categorized in a hierarchy according to the ability of the optical links 130 to support the optical signal types according to the ranking of the optical signal types.

In some embodiments, the routing system 110 may be configured to determine a route for an optical signal through the optical network 120 based on the rankings and/or categories of the optical links 130. For example, the routing metrics of the optical links 130 may be based on the rankings and/or categories of the optical links 130. In these and other embodiments, the routing system 110 may use the routing metrics based on the rankings and/or categories of the optical links 130 to determine the route.

As another example, as discussed above, in some embodiments, the routing system 110 may be configured to adjust the routing metrics of one or more of the optical links 130 based on the signal noise tolerance of the optical signal to be routed. For example, the example discussed above indicates that routing metrics of higher quality optical links may be adjusted. In these and other embodiments, before adjusting routing metrics of one or more of the optical links 130, the routing system 110 may categorize the optical links 130 based on the characteristics of the optical links 130.

In some embodiments, after categorizing the optical links 130, the routing system 110 may be configured to select, based on the categorization of optical links 130, one or more of the optical links 130 for which the routing metrics are to be adjusted. In these and other embodiments, the routing system 110 may be configured to not adjust the routing metrics of all of the optical links 130. Rather, the routing system 110 may be configured to adjust the routing metrics of some of the optical links 130. In some embodiments, the optical links 130 with routing metrics that are adjusted may be optical links 130 that may be categorized as being able to support multiple different optical signal types and/or to support optical signal types with lower signal noise tolerances.

As discussed, the routing system 110 may be configured to adjust the routing metrics based on the signal noise tolerance of an optical signal to be routed. Further, each of the optical links 130 may include an unadjusted routing metric. In these and other embodiments, the adjustments made to the routing metrics of the optical links 130 for routing an optical signal may not apply for routing another optical signal. For example, the routing system 110 may adjust the routing metrics for a first optical signal. When adjusting the routing metrics for a second optical signal, the routing system 110 may disregard the adjustments made to the routing metrics for the first optical signal and reapply new adjustments to the routing metrics for routing the second optical signal.

Modifications, additions, or omissions may be made to the environment 100 without departing from the scope of the present disclosure. For example, in some embodiments, the optical network 120 may include more or fewer network nodes 122 and optical links 130 than those illustrated. Alternately or additionally, the routing system 110 may include one or more devices and/or systems that may be connected by a network, such as the optical network 120 or another network.

FIG. 2 illustrates an example optical link 200, according to at least one embodiment in the present disclosure. The optical link 200 may include a first device 210, a second device 220, and an optical fiber 230. The optical fiber 230 may be configured to optically couple the first device 210 and the second device 220. In these and other embodiments, the optical fiber 230 may be configured to carry an optical signal between the first device 210 and the second device 220.

In some embodiments, the first device 210 may be configured to transmit and/or receive an optical signal through the optical fiber 230. The first device 210 may include an optical amplifier and may be included as part of a transponder, transceiver, transmitter, or receiver. The first device 210 may be part of a first network node of an optical network.

In some embodiments, the second device 220 may be configured to transmit and/or receive an optical signal through the optical fiber 230. The second device 220 may include an optical amplifier and may be included as part of a transponder, transceiver, transmitter, or receiver. The second device 220 may be part of a second network node of the optical network.

The optical fiber 230 may be a fiber configured to carry optical signals and may be any type of optical fiber. For example, the optical fiber 230 may be a dispersion-shifted fiber (DSF), a single-mode optical fiber (SMF), or a multi-mode optical fiber (MMF), among other types of optical fibers. The optical fiber 230 may have varying lengths, such as, any number of feet, meters, or kilometers. For example, the optical fiber 230 may have a length that ranges between 1 inch and 300 or more kilometers. Modifications, additions, or omissions may be made to the optical link 200 without departing from the scope of the present disclosure.

Figure 3:
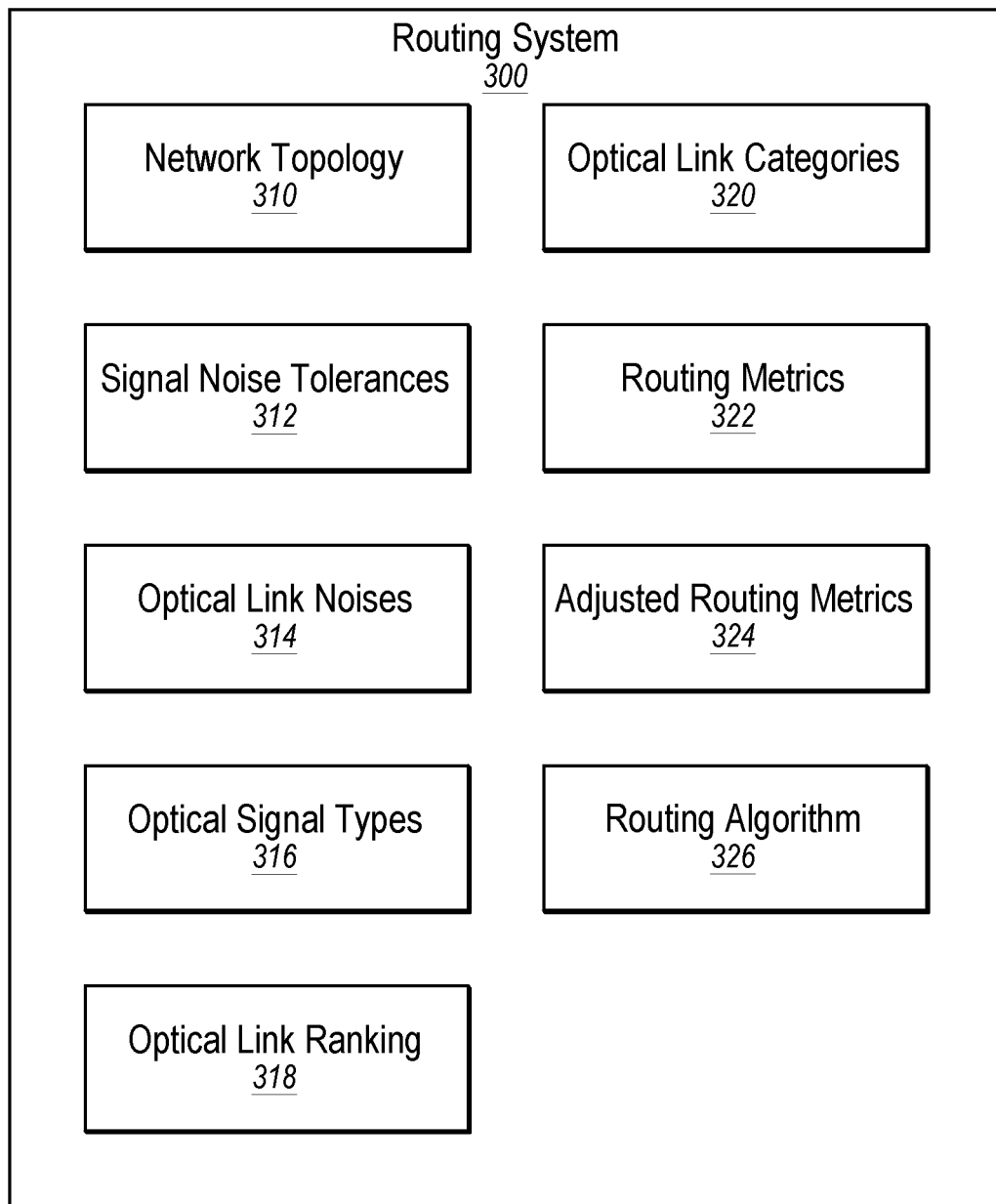
FIG. 3 illustrates an example routing system for optical networks.

FIG. 3 illustrates an example routing system 300 for optical networks, according to at least one embodiment in the present disclosure. The routing system 300 may include information such as information related to a network topology 310, signal noise tolerances 312, optical link noises 314, optical signal types 316, optical link rankings 318, optical link categories 320, routing metrics 322, adjust routing metrics 324, and routing algorithms 326.

In some embodiments, the routing system 300 may be configured to determine routes for optical signals through an optical network using the information included in the routing system 300. In these and other embodiments, the routing system 300 may obtain the information from memory, from another system or systems, from user input, or from determining the information based on other information.

The network topology 310 may provide a topology of an optical network. The topology may provide an indication of network nodes and optical links in the optical network. Alternately or additionally, the topology may indicate connections between the network nodes and the optical links. The topology may provide additional information about network nodes and the optical links, such as devices in optical links and the type of optical fibers in the optical links, include characteristics of the devices and optical fibers.

In some embodiments, the optical signal types 316 may provide information regarding the types of optical signals that may be supported by the optical network. Optical signals may vary based on various characteristics of the optical signals, such as a modulation scheme, a data rate, or a channel spectral width, among others. In some embodiments, optical signals with all the same characteristics may be considered optical signals of the same type. Alternately or additionally, optical signals with some shared characteristics and some different characteristics may be considered optical signals of the same type.

In some embodiments, the signal noise tolerances 312 may provide information regarding the noise tolerances of the optical signal types 316 that may be supported by the optical network. The signal noise tolerances may indicate a maximum noise to which an optical signal type may be subjected before the integrity of the optical signal type may be lost. The maximum noise may be determined based on optical signal types. In some embodiments, the maximum noise may be based on a statistical distribution. Thus, the maximum noise may be a maximum noise to which an optical signal type may be subjected before the integrity of the optical signal type may be lost for a certain percentage of optical signal types, such as for a standard deviation of optical signal types. Thus, the maximum noise may not apply for every optical signal type but provides an indication of a maximum noise tolerable for an average optical signal type.

In some embodiments, the optical link noises 314 may provide information of an optical noise for each of the optical links in the optical network. The optical noise for each of the optical links may be based on a mathematical combination of noises, including amplified stimulated emission noise of the optical links and nonlinear noise of the optical links. In some embodiments, the optical noise for each of the optical links may be simple addition of the amplified stimulated emission noise and nonlinear noise.

In some embodiments, the amplified stimulated emission noise may result from devices in the optical links, such as optical amplifiers in a transmitter and a receiver of an optical link. The amplified stimulated emission noise may be related to intensity noise and may be used to determine an optical noise to signal ratio (OSNR) of an optical link.

In some embodiments, the nonlinear noise may be related to phase noise and may result from the optical fiber. The nonlinear noise may be based on an optical fiber type, a modulation scheme for an optical signal being carried by an optical link, and/or an input power of the optical signal. As such, the nonlinear noise may vary based on an optical signal type being carried by an optical link. Thus, the optical link noises 314 may provide an optical noise for each of the optical signal types 316 for each of the optical links. For example, if there are ten optical signal types 316, the optical link noises 314 may provide ten optical noises for each of the optical links in the optical network.

Based on the signal noise tolerances 312 and the optical link noises 314, the routing system 300 may determine which of the optical links may support each of the optical signal types 316. For example, an optical link may support an optical signal type if the maximum noise of the optical signal type is less than or greater than the noise of the optical link for the optical signal type, where the noise is the combination of the amplified stimulated emission noise and nonlinear noise. Based on this definition, the quality of an optical link may be defined as a proportion of the maximum noise of an optical signal type. For example, an optical link may be configured to support an optical signal type if a quality of the optical link for the optical signal type is less than one when the quality of the optical link with respect to the optical signal type is the combined noise of the optical link with respect to an optical signal type divided by the maximum noise of the optical signal type.

In some embodiments, the optical link rankings 318 may provide a ranking of the optical links with respect to the ability of the optical links to carry the optical signal types 316. In some embodiments, to rank the optical links the optical signal types may be ranked according to the signal noise tolerances 312 of the optical signal types 316. After ranking the optical signal types 316 according to the signal noise tolerances 312, all optical links with a quality less than one for the least ranked optical signal type, i.e., the optical signal type with the worst signal noise tolerance, are provided the highest ranking. In these and other embodiments, the quality of the optical link with respect to the optical signal type may be the combined noise of the optical link with respect to an optical signal type divided by the maximum noise of the optical signal type as described previously. The optical links with a quality less than one for the next least ranked optical signal type and a quality more than one for the least ranked optical signal type are ranked second highest. This ranking continues for each of the ranked optical signal types 316. Thus, the lowest ranked optical links may be those optical links that are only able to support the optical signal types 316 with the most signal noise tolerance. Furthermore, a higher ranked optical link indicates an ability for the higher ranked optical link to support more optical signal types, including optical signal types with lower signal noise tolerances.

In some embodiments, the optical link categories 320 may provide information regarding categories of the optical links. The optical links may be categorized based on the ranks of the optical links from the optical link rankings 318. For example, the ranked optical links may be categorized into groups based on their rankings. As an example, if there are fifteen rankings of optical links, the five highest ranked optical links may be assigned to a first category, the next five highest ranked optical links may be assigned to a second category, and the lowest five ranked optical links may be assigned to a third category. In this example, the first category may include high-quality optical links, the second category may include medium-quality optical links, and the third category may include low-quality optical links. The number of categories may be any number and may be 2, 3, 4, 5, 6, 8, 10, 15, 20, or more.

In some embodiments, the routing metrics 322 may provide information about the criteria that may be used by the routing algorithms 326 to route an optical signal through the optical network. For example, the criteria may include costs of operating an optical link, a length of the optical link, an optical signal to noise ratio of an optical link, a latency of an optical link, and/or an available capacity of an optical link, among other criteria. In these and other embodiments, the routing metric of an optical link may have a value or values that is determined based on the criteria. For example, a value of a routing metric of an optical link may be a mathematical combination of values for each of the criteria. Alternately or additionally, the routing metrics 322 may be based on the optical link rankings 318 and/or the optical link categories 320. In these and other embodiments, a ranking of an optical link in the optical link rankings 318 may be used as a criterion for the routing metrics 322. For example, a value assigned to a ranking of an optical link may be used as a routing metric or in the calculation of a routing metric. Alternately or additionally, a value assigned to a category of an optical link may be used as a routing metric or in the calculation of a routing metric.

In some embodiments, the adjusted routing metrics 324 may include the routing metrics 322 with adjustments applied to one or more of the routing metrics 322 based on the signal noise tolerance of the optical signal to be routed and the optical link categories 320. An adjustment may be applied to the routing metrics of the optical links in one or more selected categorizes of the optical link categories 320. For example, if there are five categories and three categories are selected for adjustment and the amount of the adjustment is five based on the signal noise tolerance, all of the routing metrics of the optical links in the three categories may be adjusted by five. The categories may be selected based on what quality of optical links the routing algorithm is to favor during the routing determination process. For example, to cause the routing algorithm to favor a first category, a second category with opposite characteristics of the first category may be selected. As an example, to cause the routing algorithm to favor lower quality optical links, the selected categories may be categories with higher quality optical links.

In some embodiments, a different adjustment may be applied to each of the categories. For example, an amount of an adjustment may be determined based on the signal noise tolerance of the optical signal as discussed below. The amount of the adjustment may be further adjusted for each of the selected categories. For example, if there are five categories and three categories are selected for adjustment and the amount of the adjustment is five based on the signal noise tolerance, all of the routing metrics of the optical links in the three categories may be adjusted, with the optical links in a first of the three categories being adjusted by one, a second of the three categories being adjusted by three, and a third of the three categories being adjusted by five. A level of granularity of the adjustment may be based on a number of different fiber types in the optical network, capacity of the optical network, expected further capacity of the optical network, and/or how much optical signals are to be distributed throughout the optical links of the optical network.

An amount of an adjustment to apply to the routing metrics 322 may be based on the signal noise tolerance of the optical signal. In these and other embodiments, an amount of the signal noise tolerance may determine an amount of the adjustment applied to the routing metrics 322. For example, as the amount of the signal noise tolerance increases the amount of the adjustment may also increase.

In some embodiments, an algorithm may be used to determine an amount of the adjustment. For example, the algorithm may take as an input the signal noise tolerance and output an amount for the adjustment.

In some embodiments, the amount of the adjustment may be based on the values of the routing metrics 322. For example, in some embodiments, the amount of the adjustment may be a mathematical combination of the values of the routing metrics 322, such as an average or some multiple of an average of the values of the routing metrics 322. Alternately or additionally, the amount of the adjustment for each category may be based on other algorithms that are determined based on a number of different fiber types in the optical network, capacity of the optical network, expected further capacity of the optical network, and/or how much the optical signals are to be distributed throughout the optical links of the optical network. Note that in some circumstances, the amount of the adjustment may be zero.

In some embodiments, the amount of the adjustment may be based on a binning technique where any signal noise tolerance what falls within a value include in a bin is assigned an adjustment amount assigned to the bin. The number of bins may be any whole number more than one. For example, the number of bins may be 2, 3, 4, 5, 6, 8, 10, 15, 20, or more. For example, the signal noise tolerances 312 may be divided into three bins. As an example, a first bin may be for optical signals with a signal noise tolerance less than 18 db, a second bin may be for optical signals with a signal noise tolerance between 18 db and 23 db, and a third bin may be for optical signals with a signal noise requirement above 23 db. Each of the bins may include a corresponding adjustment amount. For example, the first bin may include an adjustment that is twice the average of the values of the routing metrics 322. The second bin may include an adjustment that is the average of the values of the routing metrics 322. The third bin may include an adjustment that is zero.

In some embodiments, the routing algorithms 326 may include one or more algorithms that may be used to determine a route for an optical signal through the optical network based on the adjusted routing metrics 324 of the optical links in the optical network. The routing algorithm may obtain the adjusted routing metrics 324 and determine the route. The routing algorithms 326 may determine the route by minimizing a total routing metric value between the source and destination. The routing algorithms 326 may be known routing algorithms, for example, the Dijkstra algorithm, the Prim algorithm, or other shortest path algorithms.

Modifications, additions, or omissions may be made to the routing system 300 without departing from the scope of the present disclosure. For example, in some embodiments, the routing system 300 may include a processor and/or memory similar to the processor 910 and the memory 912 of FIG. 9. In these and other embodiments, the information of the network topology 310, the signal noise tolerances 312, the optical link noises 314, the optical signal types 316, the optical link rankings 318, the optical link categories 320, the routing metrics 322, the adjust routing metrics 324, and the routing algorithms 326 may be stored in the memory and the processor may perform instructions to make determinations as described with respect to FIG. 3.

Alternately or additionally, the routing system 300 may not include the adjusted routing metrics 324. In these and other embodiments, the routing algorithms 326 may use the routing metrics 322 to determine a route for an optical signal through an optical network. In these and other embodiments, the routing metrics 322 may be based on the optical link rankings 318. Alternately or additionally, the routing algorithms 326 may be adjusted based on the optical link rankings 318.

Alternately or additionally, the routing system 300 may not include the optical link ranking 318. In these and other embodiments, the optical link categories 320 may be based on optical link noises 314 and/or other criteria.

Figure 4A:
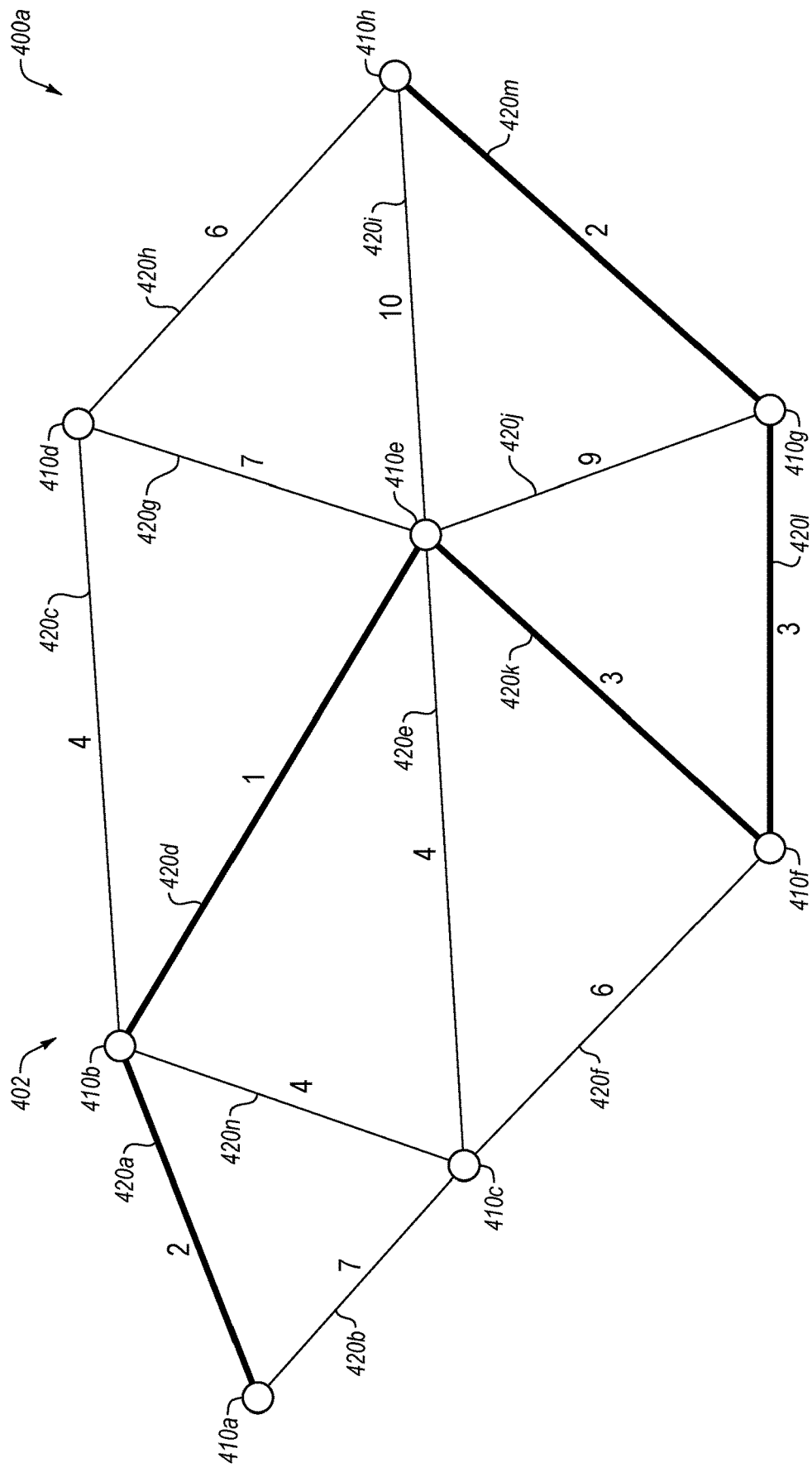
FIGS. 4*a-c* illustrate example optical network diagrams.

FIGS. 4A-Cc illustrate example optical network diagrams, according to at least one embodiment in the present disclosure. For example, FIG. 4A may illustrate a first optical network diagram 402a, FIG. 4B may illustrate a second optical network diagram 402b, and FIG. 4C may illustrate a third optical network diagram 402c, referred to collectively as the optical network diagrams 400.

The optical network diagrams 400 may illustrate an optical network 402. The optical network 402 may include a first network node 410a, a second network node 410b, a third network node 410c, a fourth network node 410d, a fifth network node 410e, a sixth network node 410f, a seventh network node 410g, and a eighth network node 410h, referred to collectively as the network nodes 410. The optical network 402 may further include a first optical link 420a, a second optical link 420b, a third optical link 420c, a fourth optical link 420d, a fifth optical link 420e, a sixth optical link 420f, a seventh optical link 420g, an eighth optical link 420h, a ninth optical link 420i, a tenth optical link 420j, an eleventh optical link 420k, a twelfth optical link 420l, a thirteenth optical link 420m, and a fourteenth optical link 420n, referred to collectively as the optical links 420.

The optical network diagrams 400 may also each illustrate a routing metric, such as a whole number, for each of the optical links 420. The routing metrics of the optical links 420 may vary between the optical network diagrams 400. For example, the first optical network diagram 400a may illustrate routing metrics of the optical links 420 without adjustments. The second optical network diagram 400b may illustrate routing metrics of the optical links 420 with first adjustments and the third optical network diagram 400c may illustrate routing metrics of the optical links 420 with second adjustments. The routing metrics of the optical links 420 may be based on any criteria, such as the criteria discussed with respect to the routing metrics 322 of FIG. 3.

Figure 4B:
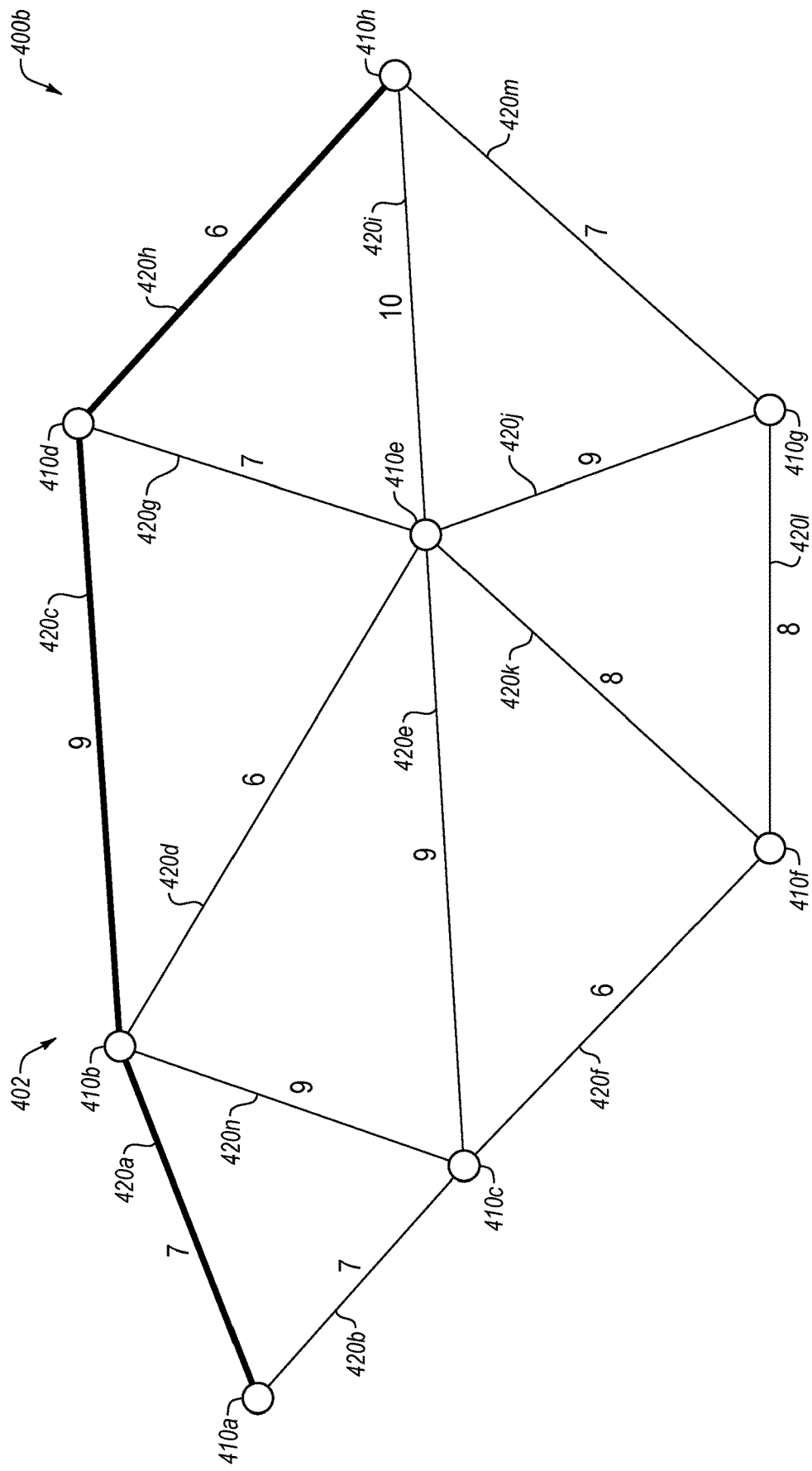
Figure 4C:
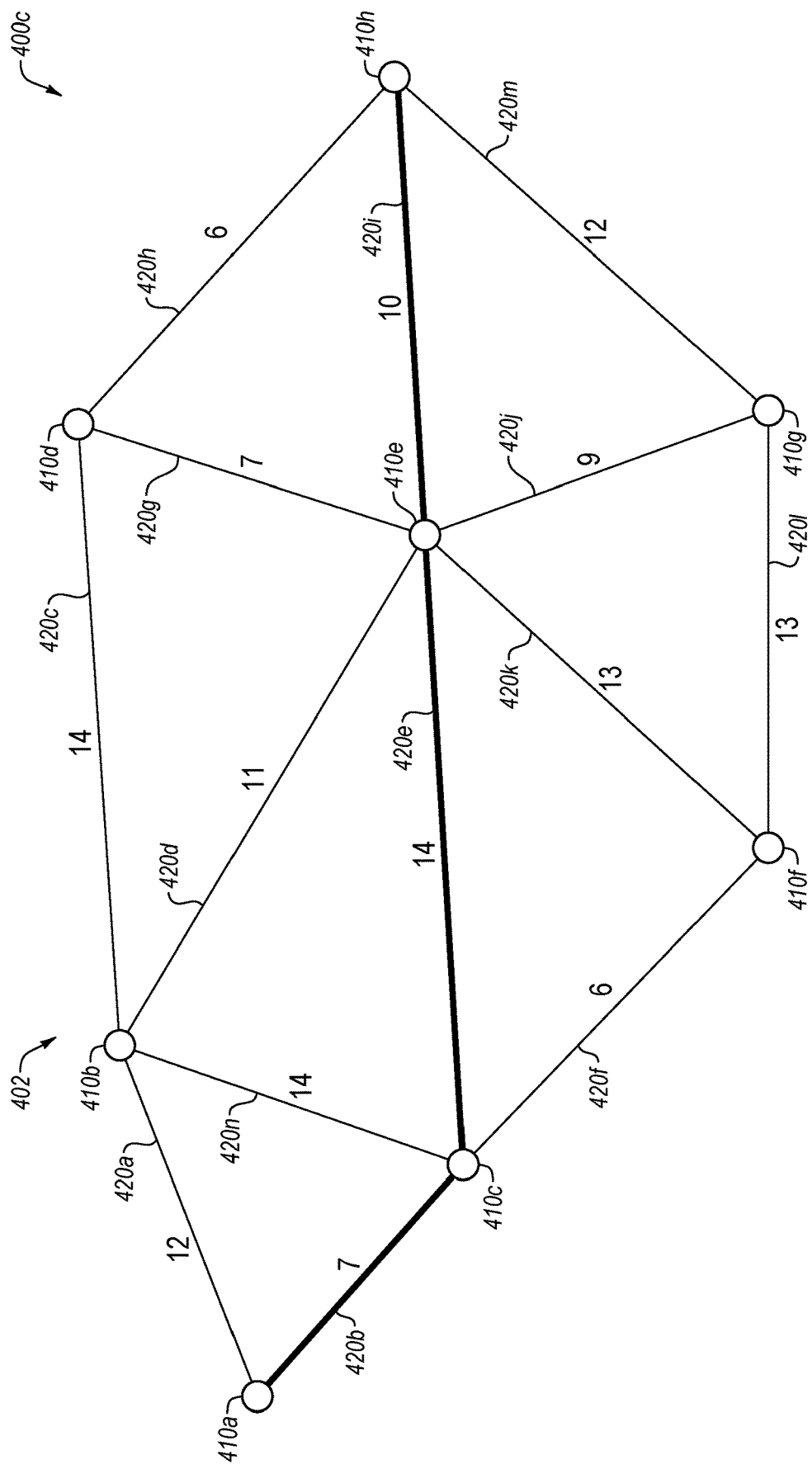

As illustrated in the optical network diagrams 400 shown in each of FIGS. 4A-C, the optical links 420 may be divided in three categories. The optical links 420 may be divided into the three categories based on information about the optical links 420. For example, the information about the optical links 420 may include an OSNR of the optical links 420. Alternately or additionally, the information about the optical links 420 may include an ability of the optical links 420 to carry optical signal types. In these and other embodiments, the information may include a ranking of the optical links 420 based on the ability of the optical links 420 to carry optical signal types. The ranking of the optical links may be determined in a manner as described with respect to the optical link rankings 318 of FIG. 3. In these and other embodiments, the categories of the optical links 420 may be determined in a manner as described with respect to the optical link categories 320 of FIG. 3.

As described with respect to FIGS. 4A-C, the routing metrics may be determined using a metric calculation method and the categories may be determined using a category calculation method. For example, the metric calculation method may consider information regarding the optical links 420 without considering optical signal types to be routed through the optical network 402. The category calculation method may consider the optical signal types to be routed through the optical network 402 and a type of optical signal to be routed through the optical network 402 for a particular routing. In these and other embodiments, some of the information used by the metric calculation method to determine the routing metrics may be used by the category calculation method to determine the categories. Alternately or additionally, each of the metric calculation method and the category calculation method may use different information.

For explanation purposes for each of FIGS. 4A-C, the first category of the optical links 420 may be considered high-quality optical links as the optical links may be configured to carry any optical signal type that may be supported by the optical network 402. The first category of the optical links 420 may include a first optical link 420a, the third optical link 420c, the fifth optical link 420e, the eleventh optical link 420k, the twelfth optical link 420l, the thirteenth optical link 420m, and the fourteenth optical link 420n.

The second category of the optical links 420 may be considered medium-quality optical links as the optical links may be configured to carry some optical signal types that may be supported by the optical network 402. The second category of the optical links 420 may include the second optical link 420b, the sixth optical link 420f, and the eighth optical link 420h.

The third category of the optical links 420 may be considered low-quality optical links as the optical links may be configured to carry few optical signal types that may be supported by the optical network 402. The third category of the optical links 420 may include the seventh optical link 420g, the tenth optical link 420j, and the ninth optical link 420i.

A routing algorithm may be configured to determine routes through the optical network 402. The routing algorithm may be configured to determine a route with a lowest routing metric score based on a combined score of the routing metrics along a route.

In some embodiments, the first optical network diagram 400a may illustrate a route selected for a first optical signal with a low noise signal tolerance. Due to the low noise signal tolerance, all three categories of the optical links 420 may be considered for carrying the first optical signal. Because all three categories of the optical links 420 may be considered for carrying the first optical signal, no adjustments may be made to the routing metrics of the optical links 420 before the routing algorithm is used to determine a route through the optical network 402 from the first network node 410a to the eighth network node 410h.

The routing algorithm may identify a route with a lowest routing metric score based on the unadjusted routing metrics of the optical links 420. The optical links 420 along the route are bolded in the first optical network diagram 400a. The route includes the first optical link 420a, the fourth optical link 420d, the eleventh optical link 420k, the twelfth optical link 420l, and the thirteenth optical link 420m. The routing metric score is a combination of the routing metrics along the route and is eleven.

In some embodiments, the second optical network diagram 400b may illustrate a route selected for a second optical signal with a medium noise signal tolerance. Due to the medium noise signal tolerance, all three categories of the optical links 420 may be considered for carrying the second optical signal. However, the routing metrics of the optical links 420 in the high-quality optical links category may be adjusted with a first adjustment. The first adjustment may cause the routing algorithm to disfavor the high-quality optical links. The first adjustment may be an average of the routing metrics of the optical links 420, which may be five. Thus, a value of five may be added to each of the routing metrics of the high-quality optical links before the routing algorithm is used to determine a route through the optical network 402 from the first network node 410a to the eighth network node 410h. The second optical network diagram 400b illustrates the adjustment in the routing metrics of the high-quality optical links.

The routing algorithm may identify a route with a lowest routing metric score based on the adjusted routing metrics of the optical links 420. The optical links 420 along the route are bolded in the second optical network diagram 400b. The route includes the first optical link 420a, the third optical link 420c, and the eighth optical link 420h. The routing metric score is a combination of the routing metrics along the route and is twenty-two. Note that the routing algorithm selected two of the high-quality optical links of the optical links 420, but the route in the second optical network diagram 400b is different from the route of the first optical network diagram 400a. Furthermore, the route of the first optical network diagram 400a with the adjusted routing metrics includes a routing metric score of thirty-six, much higher than the routing metric score of twenty-two for the route in the second optical network diagram 400b.

In some embodiments, the third optical network diagram 400c may illustrate a route selected for a third optical signal with a high noise signal tolerance. Due to the high noise signal tolerance, all three categories of the optical links 420 may be considered for carrying the third optical signal. However, the routing metrics of the optical links 420 in the high-quality optical links category may be adjusted with a second adjustment. The second adjustment may cause the routing algorithm to highly disfavor the high-quality optical links such that the routing algorithm may avoid the high-quality optical links unless for a particular portion of the optical links 420 high-quality optical links are the only optical links available. The second adjustment may be double an average of the routing metrics of the optical links 420, which may be ten. Thus, a value of ten may be added to each of the routing metrics of the high-quality optical links before the routing algorithm is used to determine a route through the optical network 402 from the first network node 410a to the eighth network node 410h. The third optical network diagram 400c illustrates the adjustment in the routing metrics of the high-quality optical links as compared to the first optical network diagram 400a and the second optical network diagram 400b.

The routing algorithm may identify a route with a lowest routing metric score based on the adjusted routing metrics of the optical links 420. The optical links 420 along the route are bolded in the third optical network diagram 400c. The route includes the second optical link 420b, the fifth optical link 420e, and the ninth optical link 420i, none of which are part of the routes in the first optical network diagram 400a and the second optical network diagram 400b. The routing metric score is a combination of the routing metrics along the route and is thirty-one. Note that the routing algorithm selected one of the high-quality optical links of the optical links 420, but this may not be avoided as the only high-quality optical links span a particular section of the optical network from the left-side network nodes to the right-side network nodes in the particular section. Furthermore, the route of the first optical network diagram 400a with the adjusted routing metrics includes a routing metric score of sixty-one, much higher than the routing metric score of thirty-one for the route in the third optical network diagram 400c. Note that the third optical network diagram 400c incorporates one of the low-quality optical links, the ninth optical link 420i. Modifications, additions, or omissions may be made to the optical network diagrams 400 without departing from the scope of the present disclosure.

Figure 5:
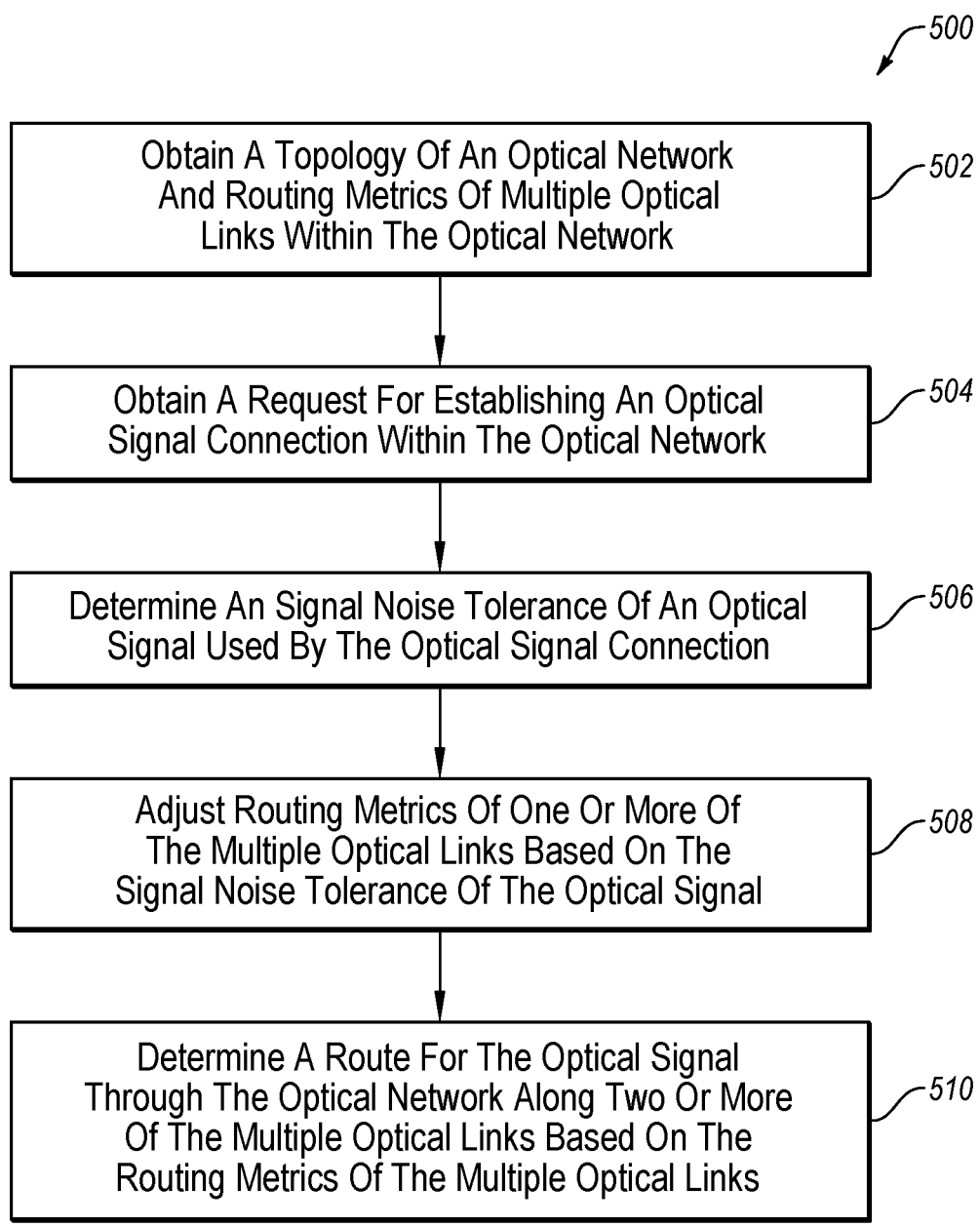
FIG. 5 illustrates a flowchart of an example method of determining routes for optical signals through optical networks.

FIG. 5 illustrates a flowchart of an example method 500 of determining routes for optical signals through optical networks. The method 500 may be arranged in accordance with at least one embodiment described in the present disclosure. One or more operations of the method 500 may be performed, in some embodiments, by a device or system, such as the routing system 110 or 300 of FIGS. 1 and 3, the system 900 of FIG. 9 or another device, combination of devices, system, or systems. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, where a topology of an optical network and routing metrics of multiple optical links within the optical network may be obtained. For example, a routing system, such as the routing system 110 of FIG. 1 or the routing system 300 of FIG. 3, may be configured to obtain the topology of the optical network. For example, the topology of the optical network may be entered into the routing system. The routing metrics of the multiple optical links may be obtained by the routing system by calculating the routing metrics based on information about the multiple optical links provided to the routing system.

At block 504, a request for establishing an optical signal connection within the optical network may be obtained. The request may include a customer of the optical network requesting a new data connection between a source and a destination. In these and other embodiments, the data for the data connection may be carried by an optical signal connection through the optical network. For example, the customer may be a company that requests a data connection of a certain size be established and maintained for an extended period of time.

At block 506, a signal noise tolerance of an optical signal used by the optical signal connection may be determined. The routing system may determine the signal noise tolerance based on the characteristics of the optical signal connection that may established.

At block 508, routing metrics of one or more of the multiple optical links may be adjusted based on the signal noise tolerance of the optical signal. In these and other embodiments, the routing system may determine an amount of the adjustment based on the signal noise tolerance. In some embodiments, in response to the signal noise tolerance not satisfying a first threshold, no adjustment may be made to the routing metrics. Alternately or additionally, in response to the signal noise tolerance satisfying the first threshold and not satisfying a second threshold, a first adjustment may be made to the routing metrics of the optical links categorized of higher quality. Furthermore, in response to the signal noise tolerance satisfying the first threshold and satisfying the second threshold, a second adjustment, which is larger than the first adjustment, may be made to the routing metrics of the optical links categorized of higher quality. In these and other embodiments, the optical links categorized of higher quality may be the optical links with a quality that is in an upper third of a ranking of optical link quality.

At block 510, a route for the optical signal through the optical network along two or more of the multiple optical links may be determined based on the routing metrics of the multiple optical links. In these and other embodiments, a routing algorithm may be used to determine the route based on the routing metrics. In these and other embodiments, the routing metrics used by the routing algorithm may be the adjusted routing metrics and unadjusted routing metrics. In these and other embodiments, the same routing algorithm may be used regardless of the signal noise tolerance as the adjustment is made to the inputs to the routing algorithm.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
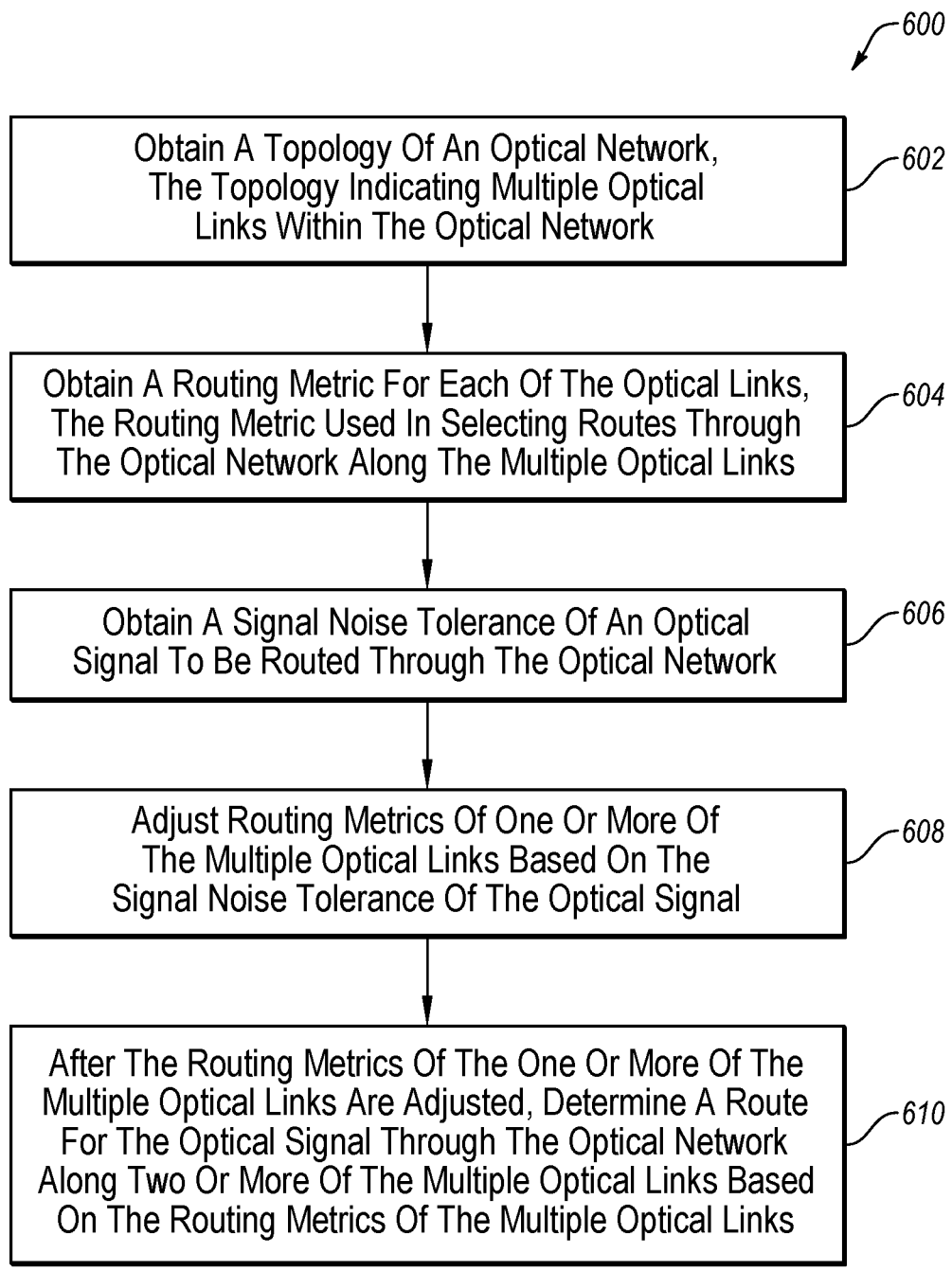
FIG. 6 illustrates a flowchart of an example method of determining routes for optical signals through optical networks.

FIG. 6 illustrates a flowchart of an example method 600 of determining routes for optical signals through optical networks. The method 600 may be arranged in accordance with at least one embodiment described in the present disclosure. One or more operations of the method 600 may be performed, in some embodiments, by a device or system, such as the routing system 110 or 300 of FIGS. 1 and 3, the system 900 of FIG. 9 or another device, combination of devices, system, or systems. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 602, where a topology of an optical network is obtained. In some embodiments, the topology may indicate multiple optical links within the optical network.

At block 604, a routing metric for each of the optical links may be obtained. In some embodiments, the routing metric may be used in selecting routes through the optical network along the multiple optical links. In some embodiments, the routing metrics may be associated with one or more criteria for which the routing of the optical signal through the optical network is based. In these and other embodiments, the one or more criteria may include one or more of: costs of an optical link, optical signal to noise ratio of an optical link, latency of an optical link, and available capacity of an optical link, among others.

At block 606, a signal noise tolerance of an optical signal to be routed through the optical network may be obtained. At block 608, routing metrics of one or more of the multiple optical links may be adjusted based on the signal noise tolerance of the optical signal. In some embodiments, an amount of adjustment of the routing metrics of the one or more of the multiple optical links may be increased based on an increase of signal noise tolerance of the optical signal.

At block 610, after the routing metrics of the one or more of the multiple optical links are adjusted, a route for the optical signal may be determined through the optical network along two or more of the multiple optical links based on the routing metrics of the multiple optical links. In some embodiments, a routing algorithm used to determine the route for the optical signal through the optical network may be configured to reduce a total routing metric value of the route. In these and other embodiments, the adjustment to the routing metrics of the one or more of the multiple optical links may include increasing values of the routing metrics of the one or more of the multiple optical links.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include categorizing the multiple optical links based on characteristics of the multiple optical links and selecting, based on the categorization of the multiple optical links, the one or more of the multiple optical links. In some embodiments, the routing metrics of the selected one or more of the multiple optical links may be adjusted. In some embodiments, the characteristics of the selected one or more of the multiple optical links may allow the selected one or more of the multiple optical links to support a greater number of optical signal types than other of the multiple optical links.

The method 600 may further include obtaining a second signal noise tolerance of a second optical signal to be routed through the optical network and determining a route for the second optical signal through the optical network based on the routing metrics of the multiple optical links without adjusting the routing metrics of any of the multiple optical links. In some embodiments, the routing metrics of the multiple optical links may not be adjusted based on the second signal noise tolerance of the second optical signal. In these and other embodiments, the method 600 may further include before determining the route for the second optical signal through the optical network, removing the adjustment to the routing metrics of the one or more of the multiple optical links based on the signal noise tolerance of the optical signal.

Figure 7:
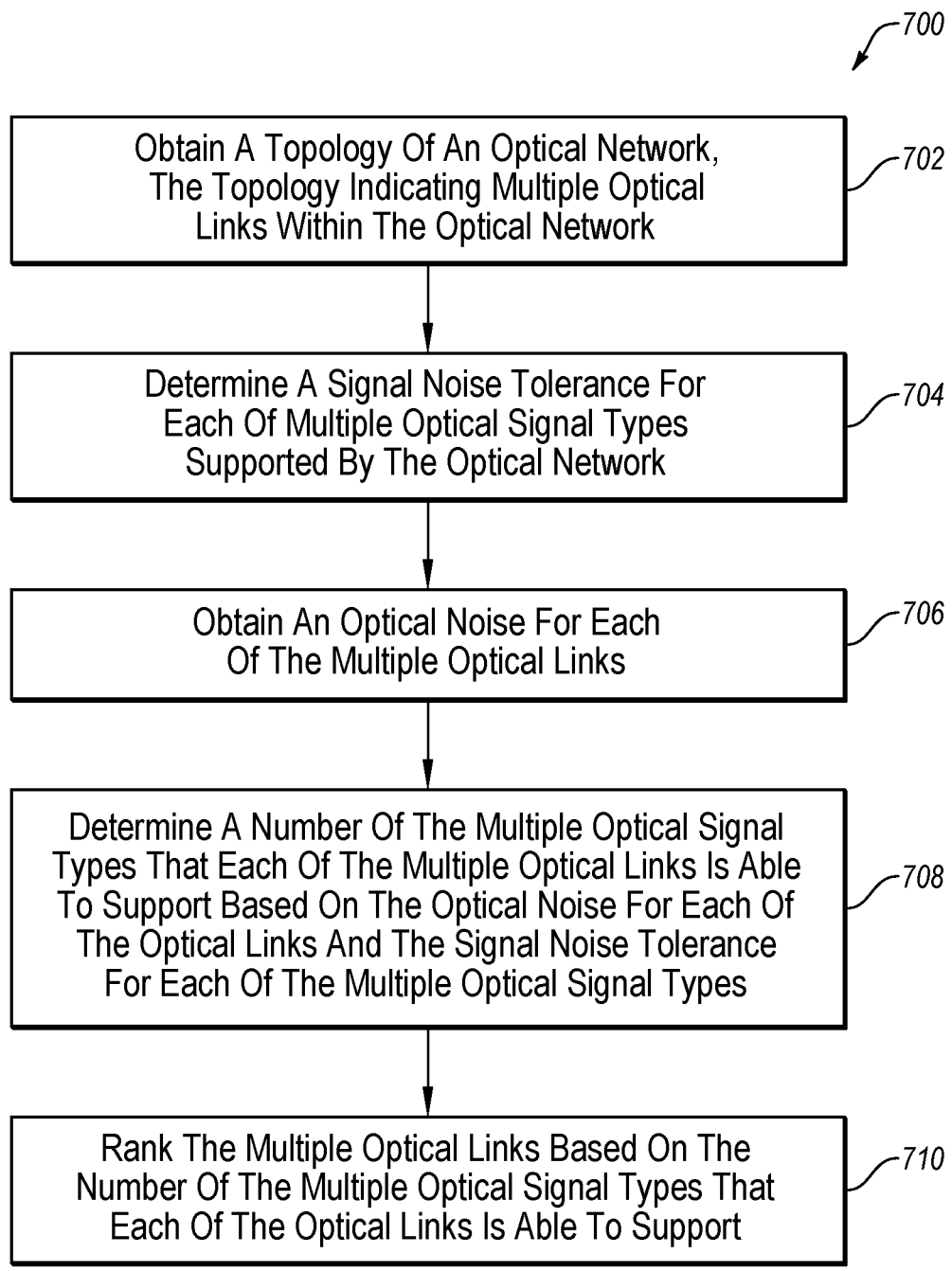
FIG. 7 illustrates a flowchart of an example method of ranking optical links.

FIG. 7 illustrates a flowchart of an example method 700 of ranking optical links. The method 700 may be arranged in accordance with at least one embodiment described in the present disclosure. One or more operations of the method 700 may be performed, in some embodiments, by a device or system, such as the routing system 110 or 300 of FIGS. 1 and 3, the system 900 of FIG. 9 or another device, combination of devices, system, or systems. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 702, where a topology of an optical network may be obtained. In some embodiments, the topology may indicate multiple optical links within the optical network.

At block 704, a signal noise tolerance for each of multiple optical signal types supported by the optical network may be determined. In some embodiments, the optical signal types may be determined based on a modulation scheme, a data rate, and/or a channel spectral width, among others.

At block 706, an optical noise for each of the multiple optical links may be obtained. In some embodiments, obtaining the optical noise for each of the optical links may include determining an optical noise for each of the optical links with respect to each of the optical signal types. In some embodiments, the optical noise for the multiple optical links is based on a non-linear noise contribution of optical fiber in each of the multiple optical links. In these and other embodiments, the non-linear noise contribution of the optical fiber for each of the multiple optical links is based on an optical signal type being carried by the optical fiber. In these and other embodiments, the optical noise for each of the multiple optical links is further based on amplified stimulated emission noise of network elements in each of the multiple optical links.

At block 708, a number of the multiple optical signal types that each of the multiple optical links is able to support may be determined based on the optical noise for each of the optical links and the signal noise tolerance for each of the multiple optical signal types. In some embodiments, the optical signal types are determined based on a modulation scheme, a data rate, and/or a channel spectral width, among others.

At block 710, the optical links may be ranked based on the number of the multiple optical signal types that each of the optical links is able to support.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 700 may further include determining a route for an optical signal of one of the optical signal types through the optical network along two or more of the multiple optical links based on the ranking of the multiple optical links.

Figure 8:
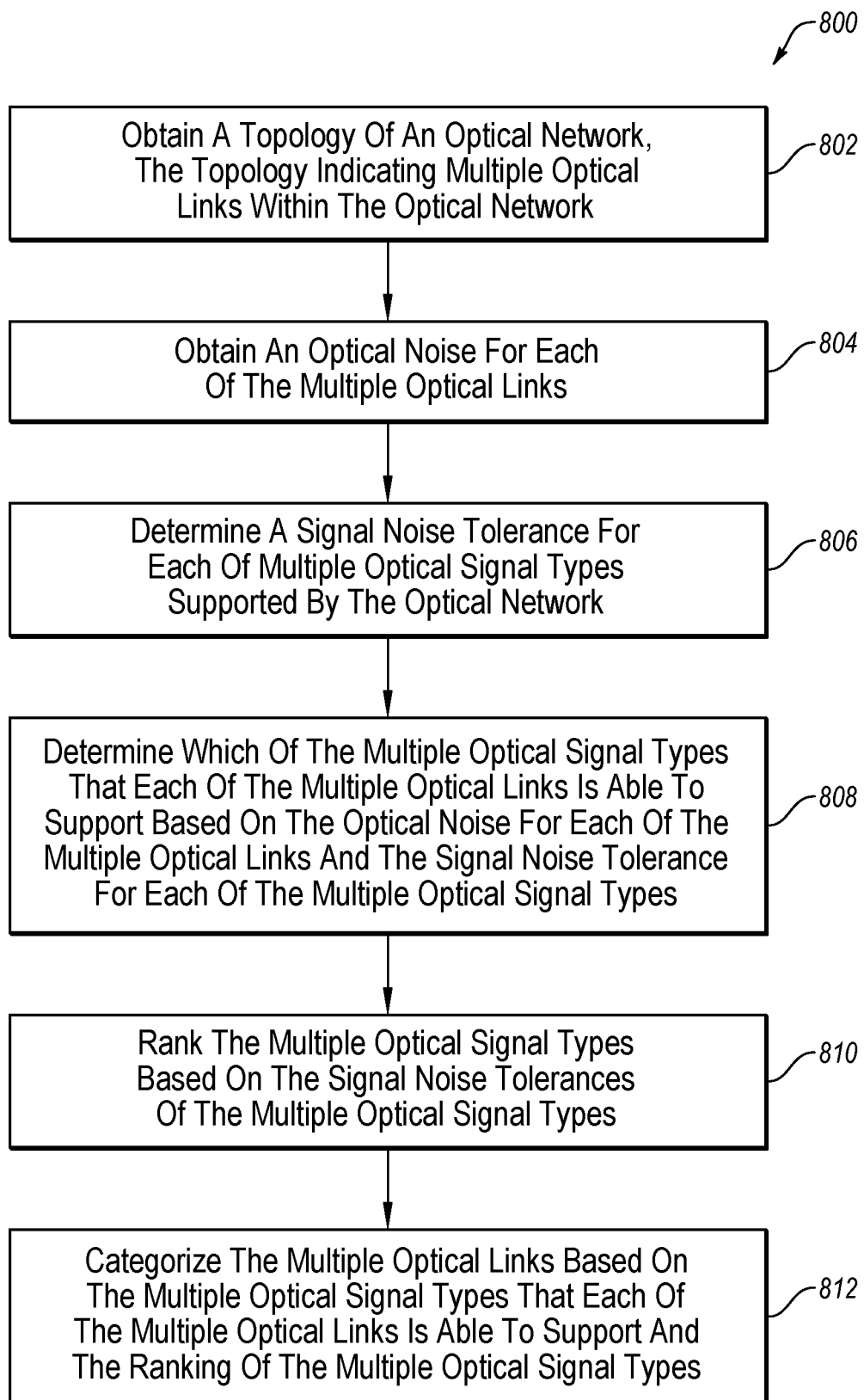
FIG. 8 illustrates a flowchart of an example method of categorizing optical links.

FIG. 8 illustrates a flowchart of an example method 800 of categorizing optical links. The method 800 may be arranged in accordance with at least one embodiment described in the present disclosure. One or more operations of the method 800 may be performed, in some embodiments, by a device or system, such as the routing system 110 or 300 of FIGS. 1 and 3, the system 900 of FIG. 9 or another device, combination of devices, system, or systems. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 802, where a topology of an optical network may be obtained. In some embodiments, the topology may indicate multiple optical links within the optical network.

At block 804, an optical noise for each of the multiple optical links may be obtained. In some embodiments, obtaining the optical noise for each of the optical links may include determining an optical noise for each of the optical links with respect to each of the optical signal types. In some embodiments, the optical noise for the multiple optical links is based on a non-linear noise contribution of optical fiber in each of the multiple optical links.

At block 806, a signal noise tolerance for each of multiple optical signal types supported by the optical network may be determined. At block 808, which of the multiple optical signal types that each of the multiple optical links is able to support may be determined based on the optical noise for each of the multiple optical links and the signal noise tolerance for each of the multiple optical signal types.

At block 810, the optical signal types may be ranked based on the signal noise tolerances of the multiple optical signal types. At block 812, the multiple optical links may be categorized based on the multiple optical signal types that each of the multiple optical links is able to support and the ranking of the multiple optical signal types.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 800 may further include determining a route for an optical signal of one of the optical signal types through the optical network along two or more of the multiple optical links based on the categorizing of the multiple optical links.

Figure 9:
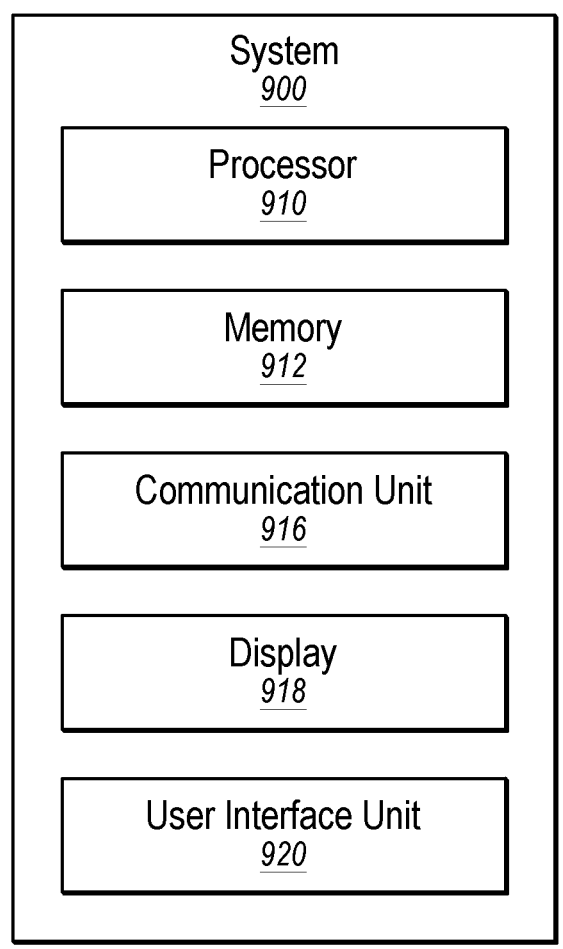
FIG. 9 illustrates an example system that may be used for determining routes for optical signals through optical networks.

FIG. 9 is a block diagram illustrating an example system 900 that may be used for determining routes for optical signals through optical networks, according to at least one embodiment of the present disclosure. The system 900 may include a processor 910, memory 912, a communication unit 916, a display 918, and a user interface unit 920, which all may be communicatively coupled. In some embodiments, the system 900 may be used to perform one or more of the methods described in this disclosure.

For example, the system 900 may be used to perform one or more of the method described in FIGS. 5, 6, 7, and 8. Alternately or additionally, the system 900 or parts of the system 900 may be part of the routing system 110 of FIG. 1 and/or the routing system 300 of FIG. 3.

Generally, the processor 910 may include any suitable special-purpose or general-purpose computer, computing entity, or processing device including various computer hardware or software modules and may be configured to execute instructions stored on any applicable computer-readable storage media. For example, the processor 910 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 9, it is understood that the processor 910 may include any number of processors distributed across any number of networks or physical locations that are configured to perform individually or collectively any number of operations described herein. In some embodiments, the processor 910 may interpret and/or execute program instructions and/or process data stored in the memory 912. In some embodiments, the processor 910 may execute the program instructions stored in the memory 912.

For example, in some embodiments, the processor 910 may execute program instructions stored in the memory 912 that are related to task execution such that the system 900 may perform or direct the performance of the operations associated therewith as directed by the instructions. In these and other embodiments, the instructions may be used to perform one or more blocks of method 500, 600, 700, or 800 of FIGS. 5-8.

The memory 912 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 910.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 910 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 916 may include any component, device, system, or combination thereof that is configured to transmit or receive information over a network. In some embodiments, the communication unit 916 may communicate with other devices at other locations, the same location, or even other components within the same system. For example, the communication unit 916 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 916 may permit data to be exchanged with a network and/or any other devices or systems described in the present disclosure.

The display 918 may be configured as one or more displays, like an LCD, LED, Braille terminal, or other type of display. The display 918 may be configured to present video, text captions, user interfaces, and other data as directed by the processor 910.

The user interface unit 920 may include any device to allow a user to interface with the system 900. For example, the user interface unit 920 may include a mouse, a track pad, a keyboard, buttons, camera, and/or a touchscreen, among other devices. The user interface unit 920 may receive input from a user and provide the input to the processor 910. In some embodiments, the user interface unit 920 and the display 918 may be combined.

Modifications, additions, or omissions may be made to the system 900 without departing from the scope of the present disclosure. For example, in some embodiments, the system 900 may include any number of other components that may not be explicitly illustrated or described. Further, depending on certain implementations, the system 900 may not include one or more of the components illustrated and described.

As indicated above, the embodiments described herein may include the use of a special purpose or general-purpose computer (e.g., the processor 910 of FIG. 9) including various computer hardware or software modules, as discussed in greater detail below. Further, as indicated above, embodiments described herein may be implemented using computer-readable media (e.g., the memory 912 of FIG. 9) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining a topology of an optical network, the topology indicating a plurality of optical links within the optical network;
    obtaining a routing metric for each of the optical links, the routing metric used in selecting routes through the optical network along the plurality of optical links;
    obtaining a signal noise tolerance of an optical signal to be routed through the optical network;
    selecting one or more of the plurality of optical links based on optical noises of the plurality of optical links;
    adjusting routing metrics of the selected optical links based on the signal noise tolerance of the optical signal; and
    after the routing metrics of the one or more of the plurality of optical links are adjusted, determining a route for the optical signal through the optical network along two or more of the plurality of optical links based on the routing metrics of the plurality of optical links.

2. The method of claim 1, wherein the adjustment of the routing metrics of the one or more of the plurality of optical links is an increase in response to an increase of signal noise tolerance of the optical signal.

3. The method of claim 1, wherein a routing algorithm used to determine the route for the optical signal through the optical network is configured to reduce a total routing metric value of the route and the adjustment to the routing metrics of the one or more of the plurality of optical links includes increasing values of the routing metrics of the one or more of the plurality of optical links.

4. The method of claim 1, wherein the routing metrics are associated with one or more criteria that form a basis for routing of the optical signal through the optical network.

5. The method of claim 4, wherein the one or more criteria includes one or more of: costs of operating an optical link, a length of an optical link, latency of an optical link, and available capacity of an optical link.

6. The method of claim 1, further comprising:
    categorizing the plurality of optical links based on characteristics of the plurality of optical links, including the optical noises of the plurality of optical links, wherein the selecting one or more of the plurality of optical links is performed based on the categorization of the plurality of optical links.

7. The method of claim 6, wherein the characteristics of the selected one or more of the plurality of optical links allows the selected one or more of the plurality of optical links to support a greater number of optical signal types than other of the plurality of optical links.

8. The method of claim 1, further comprising:
    obtaining a second signal noise tolerance of a second optical signal to be routed through the optical network; and
    determining a route for the second optical signal through the optical network based on the routing metrics of the plurality of optical links without adjusting the routing metrics of any of the plurality of optical links, the routing metrics of the plurality of optical links not being adjusted based on the second signal noise tolerance of the second optical signal.

9. The method of claim 8, further comprising before determining the route for the second optical signal through the optical network, removing the adjustment to the routing metrics of the one or more of the plurality of optical links based on the signal noise tolerance of the optical signal.

10. One or more non-transitory computer-readable storage media configured to store instructions that, in response to being executed, cause a system to perform the method of claim 1.

11. A system comprising:
    one or more computer-readable storage media configured to store instructions; and
    one or more processors communicatively coupled to the one or more computer-readable storage media and configured to, in response to execution of the instructions, cause the system to perform operations, the operations comprising:
        obtain a topology of an optical network, the topology indicating a plurality of optical links within the optical network;
        obtain a routing metric for each of the optical links, the routing metric used in selecting routes through the optical network along the plurality of optical links;
        obtain a signal noise tolerance of an optical signal to be routed through the optical network;
        select one or more of the plurality of optical links based on optical noises of the plurality of optical links;
        adjust routing metrics of the selected optical links based on the signal noise tolerance of the optical signal; and
        after the routing metrics of the one or more of the plurality of optical links are adjusted, determine a route for the optical signal through the optical network along two or more of the plurality of optical links based on the routing metrics of the plurality of optical links.

12. The system of claim 11, wherein the adjustment of the routing metrics of the one or more of the plurality of optical links is an increase in response to an increase of signal noise tolerance of the optical signal.

13. The system of claim 11, wherein a routing algorithm used to determine the route for the optical signal through the optical network is configured to reduce a total routing metric value of the route and the adjustment to the routing metrics of the one or more of the plurality of optical links includes increasing values of the routing metrics of the one or more of the plurality of optical links.

14. The system of claim 11, wherein the routing metrics are associated with one or more criteria for which the routing of the optical signal through the optical network is based.

15. The system of claim 14, wherein the one or more criteria includes one or more of: costs of an optical link, a length of an optical link, latency of an optical link, and available capacity of an optical link.

16. The system of claim 11, wherein the operations further comprise:
    categorizing the plurality of optical links based on characteristics of the plurality of optical links, including the optical noises of the plurality of optical links, wherein the selecting one or more of the plurality of optical links is performed based on the categorization of the plurality of optical links.

17. The system of claim 16, wherein the characteristics of the selected one or more of the plurality of optical links allows the selected one or more of the plurality of optical links to support a greater number of optical signal types than other of the plurality of optical links.

18. The system of claim 11, wherein the operations further comprise:
    obtaining a second signal noise tolerance of a second optical signal to be routed through the optical network; and
    determining a route for the second optical signal through the optical network based on the routing metrics of the plurality of optical links without adjusting the routing metrics of any of the plurality of optical links, the routing metrics of the plurality of optical links not being adjusted based on the second signal noise tolerance of the second optical signal.

19. The system of claim 18, further comprising before determining the route for the second optical signal through the optical network, removing the adjustment to the routing metrics of the one or more of the plurality of optical links based on the signal noise tolerance of the optical signal.

20. A method comprising:
    obtaining a topology of an optical network, the topology indicating a plurality of optical links within the optical network;
    obtaining a signal noise tolerance of an optical signal to be routed through the optical network;
    adjusting routing metrics of one or more of the plurality of optical links based on the signal noise tolerance of the optical signal; and
    after the routing metrics are determined, determining a route for the optical signal through the optical network along two or more of the plurality of optical links based on the routing metrics of the plurality of optical links.

* * * * *